UNITED STATES PATENT OFFICE.

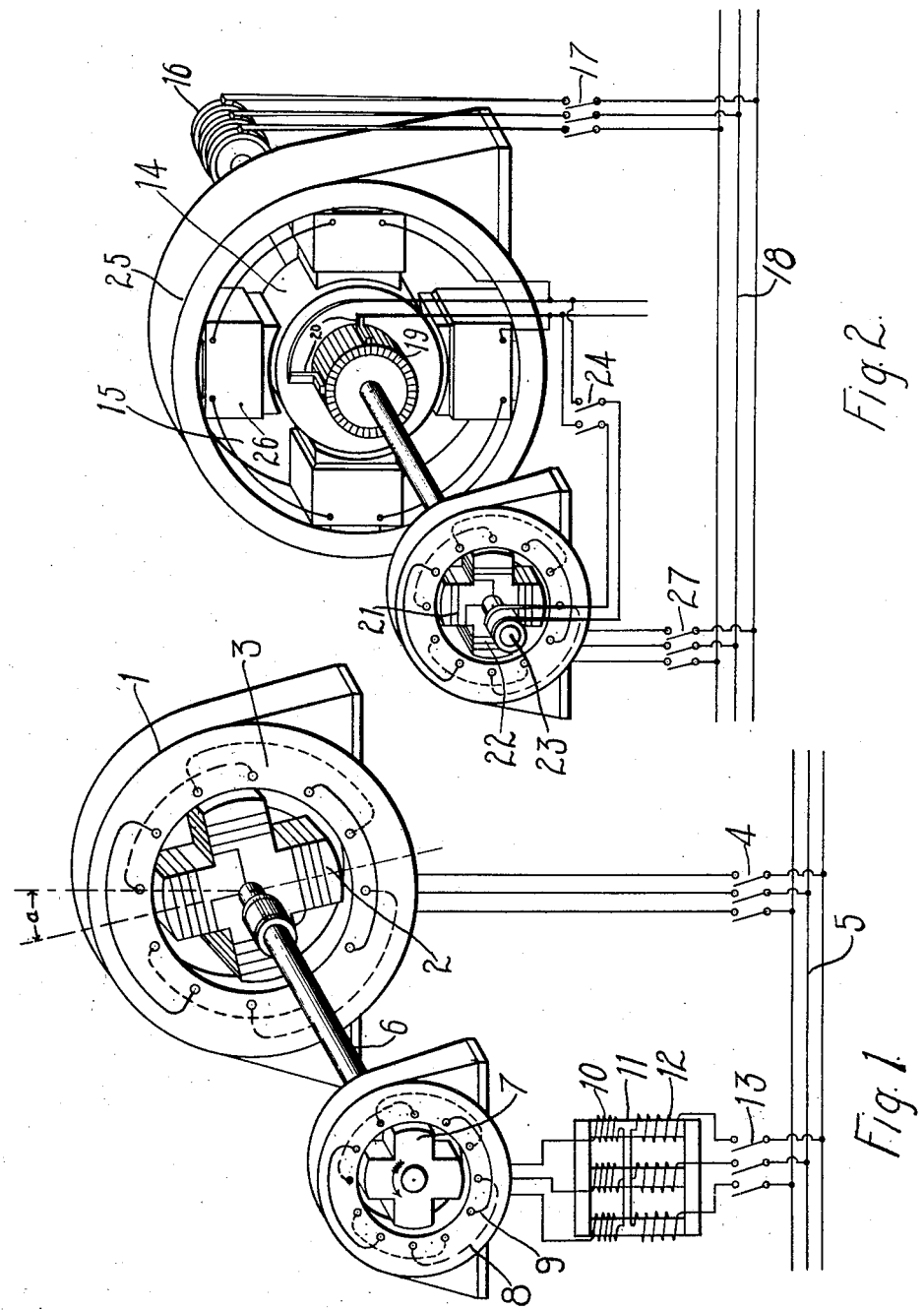

EMANUEL ROSENBERG, OF ALTRINCHAM, ENGLAND, ASSIGNOR TO WESTINGHOUSE ELECTRIC AND MANUFACTURING COMPANY, A CORPORATION OF PENNSYLVANIA.

STARTING SYNCHRONOUS MACHINES.

1,259,295.  Specification of Letters Patent.  Patented Mar. 12, 1918.

Application filed January 30, 1914. Serial No. 815,382.

*To all whom it may concern:*

Be it known that I, EMANUEL ROSENBERG, a citizen of the United States, and a resident of Altrincham, in the county of Chester, England, have invented a new and useful Improvement in Starting Synchronous Machines, of which the following is a specification.

My invention relates to synchronous dynamo electric machines and it has for its object to provide improved methods for starting and simultaneously synchronizing the same.

Heretofore two methods have been commonly employed for starting synchronous machines, the first of which consists in connecting the machine to the conductors of a circuit either directly or through a transformer and permitting it to come into synchronism with the current flowing through the circuit. This method has the disadvantage that a relatively large current is taken from the conductors during part of the time the machine is starting and, furthermore, when employed with rotary converters, the commutator brushes are liable to spark violently.

The second method of starting consists in using a starting motor, but this method, as heretofore employed, has the disadvantage that the main machine, after attaining the desired speed, must be synchronized.

In my application Serial No. 761,415, filed April 16, 1913, I have described an arrangement for starting synchronous machines by means of a starting motor in which a series or an electrically equivalent connection is provided between the windings of the starting motor and the synchronous machine for the purpose of effecting, in one operation, both the starting and the synchronizing of the synchronous machine with the supply current.

According to my present invention, I attain the hereinbefore mentioned purpose by using a starting motor of the self-starting synchronous type, preferably directly coupled to the rotary converter or other synchronous machine to be started. Such a starting motor, in its simplest form, has an ordinary stator winding for the same number of poles as the main synchronous machine and a rotor of solid steel or iron provided with grooves to form salient poles. A machine of the above mentioned description, by reason of the eddy currents which are induced in the pole faces of the same, will start like an induction motor if it is connected to the supply circuit, and it will pull into synchronism by reason of the action of the salient poles. By mechanically coupling the salient pole rotor in a predetermined position relative to the main synchronous machine, it is possible to fix the phase of the main synchronous machine relatively to the supply circuit after the starting motor has pulled into synchronism.

Figure 1 of the accompanying drawings is a diagrammatic view of a synchronous main motor and a starting motor connected to embody my invention and Fig. 2 is a diagrammatic view of my invention as applied to a rotary converter.

A synchronous three-phase motor 1, has a rotating field magnet or rotor 2 and a stator 3 the winding of which may be connected through the switch 4 to the conductors 5 which may be assumed to have a high voltage impressed thereon. Coupled to the synchronous motor by means of a shaft 6 is the rotor 7 of a starting motor 8 the stator winding 9 of which is connected to the low-tension winding 10 of a transformer 11, while the high tension winding 12 of the same is connected, by means of a starting switch 13, to the conductors 5. The direction of rotation of the set is here indicated by the arrow as counter-clockwise, and it will be observed that the rotating field magnet 2 of the synchronous motor 1 is shown in Fig. 1 as angularly displaced with respect to the starting motor in a forward direction, that is to say, it "leads" the field or rotor 7 of the starting motor 8 by a predetermined angle α. For starting, the switch 13 is closed; the rotor 7 will then start by reason of the eddy currents induced therein and will eventually pull into synchronism.

The advantages gained by the above mentioned angular displacement between the rotors of the synchronous and starting motors will be apparent from a consideration of the following:—

If two synchronous motors have the same number of poles and are supplied from the same electrical circuit, one of them being loaded and the other running idle, the rotor of the loaded motor will lag behind the rotor of the idle running motor. In the arrangement just described with reference to Fig. 1 and assuming both motors were connected to the same circuit, it would quite possible to so arrange the rotors that, with a proper choice of the angle α, the starting motor would perform all the work (that represented by friction, windage, &c.) while the synchronous motor neither returned nor received energy from the supply circuit. Under these conditions, the synchronous motor is running at the position of "true synchronism," that is to say, if connected to the line, the impressed and induced electromotive forces are 180° out of phase and the resultant electromotive force tending to force current through the armature winding is a minimum. In such case, therefore, after the starting motor has pulled into synchronism, the rotating field of the synchronous motor may be excited and the switch 4 closed with a minimum disturbance in the line. Afterward, the starting switch 13 may be opened.

Referring now particularly to Fig. 2, the winding of the armature 14, of the rotary converter 15 is connected, on one side, to three slip rings 16, which, through a three-pole switch 17, are connected to the three-phase supply circuit 18. On the other side, the armature winding is connected to the bars of the commutator cylinder 19 upon which bear a plurality of brushes 20. The rotor 21 of the starting motor has a field winding 22 connected to slip rings 23, which, by means of a switch 24, may be connected to the direct current commutator brushes 20 of the rotary converter 15. The field structure 25 of the rotary converter is stationary and its winding 26 is connected to the direct current brushes 20 through field rheostats, (not shown).

When starting, the field switch 24 of the synchronous starting motor may be open or closed, but the three-phase starting switch 27 must be closed. The machine will then run up to speed by reason of the eddy currents in the pole faces of the rotor of the starting motor and will lock into synchronism, provided the field switch 24 is closed when coming up to speed.

The rotary converter will assume a definite polarity and, therefore, the rotor of the starting motor will also be excited to assume a definite polarity.

After the starting motor has locked into synchronism, the voltage of the rotary converter may be adjusted to the correct value, the three-phase switch 17 may be closed and the starting switch 27 opened.

To effect the closing of the switch 17 without any appreciable interchange of current, it will be necessary to mechanically couple the rotor of the starting motor in a definite relation to the windings on the armature of the rotary converter in a similar manner to that hereinbefore described in connection with Fig. 1.

The starting arrangements herein described may be used for starting synchronous motors, especially high tension motors, in order to avoid the shock on the windings and frame of the main motor, which normally occurs in self-starting synchronous machines.

I claim as my invention:

1. In combination, a source of alternating current, a main synchronous dynamo-electric machine, a starting motor therefor of the synchronous type and having the same synchronous speed, and mechanical coupling means between the rotors of the two machines, the position of true synchronism in said main machine being angularly displaced with respect to the position of true synchronism in said starting motor.

2. In combination, a source of alternating current, a main synchronous dynamo-electric machine, a starting motor therefor of the synchronous type and having the same synchronous speed, and mechanical coupling means between the rotors of the two machines, the position of true synchronism in said main machine being angularly displaced in the direction of rotation with respect to the true synchronous position of said starting motor.

3. In combination, a source of alternating current, a main synchronous dynamo-electric machine, a starting motor therefor of the synchronous type and having the same synchronous speed, and mechanical coupling means between the rotors of the two machines, the position of true synchronism in said main machine being angularly displaced in the direction of rotation with respect to the true synchronous position of said starting motor by the angle through which said starting motor falls back from its true synchronous position when supplying the no load losses of the two machines.

4. In combination, a main synchronous dynamo-electric machine, a starting motor therefor of the synchronous type, each of said machines having phase wound armatures, definite polar fields, and the same synchronous speed, and a mechanical coupling between the rotors thereof, the position of true synchronism of said main machine being angularly displaced from the position of true synchronism of said starting motor by an angle less than one half the pitch of a phase winding.

In testimony whereof, I have hereunto subscribed my name this fifteenth day of January, 1914.

EMANUEL ROSENBERG.

Witnesses:
J. S. VICK,
F. NIXON.